April 1, 1958 G. T. McCLURE ET AL 2,829,009
FLUID PRESSURE BRAKE APPARATUS
Filed Oct. 13, 1954
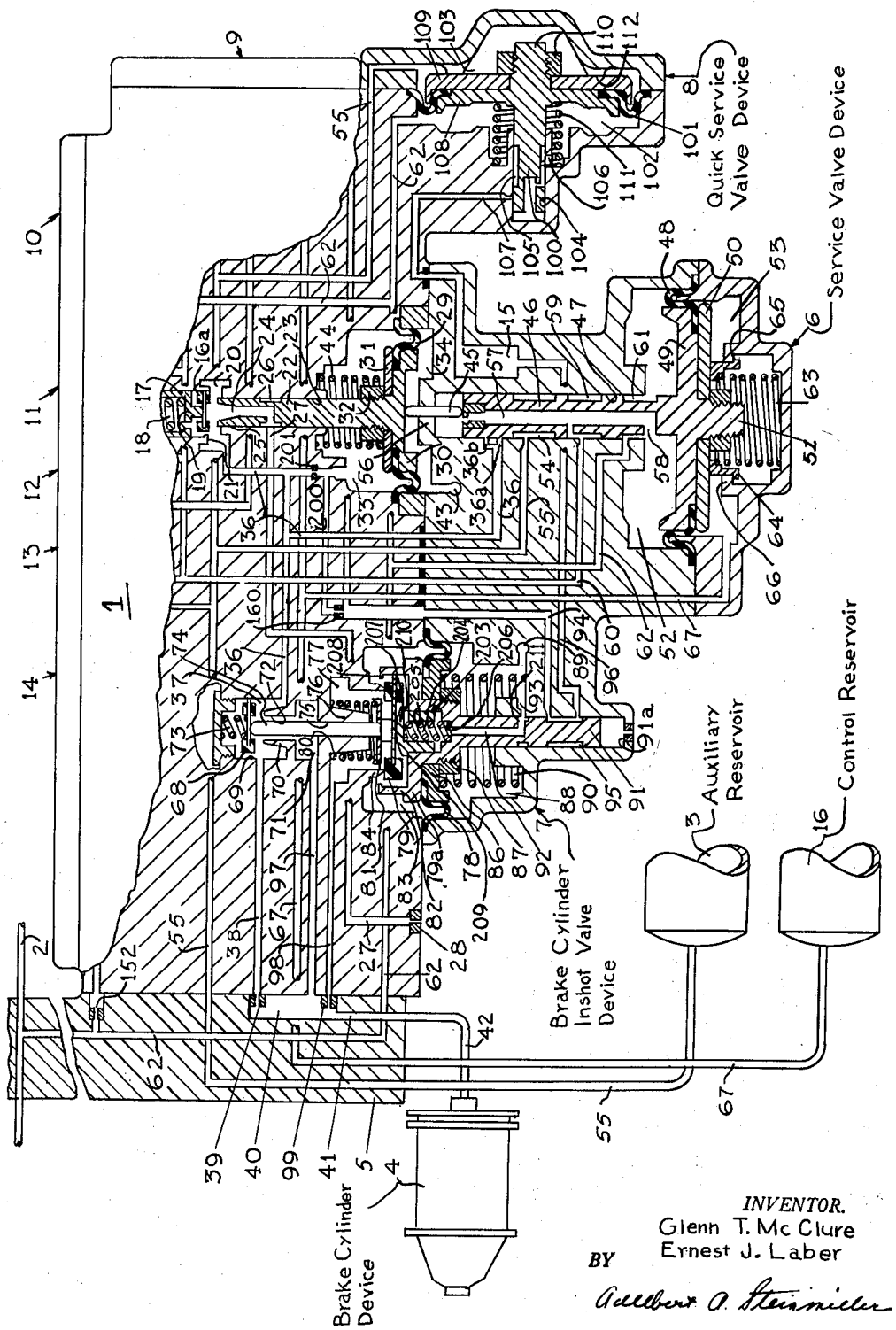
INVENTOR.
Glenn T. McClure
Ernest J. Laber
BY
Adelbert A. Steinmiller
ATTORNEY United States Patent Office 2,829,009
Patented Apr. 1, 1958

2,829,009

FLUID PRESSURE BRAKE APPARATUS

Glenn T. McClure, McKeesport, and Ernest J. Laber, Adamsburg, Pa., assignors to Westinghouse Air Brake Company, Wilmerding, Pa., a corporation of Pennsylvania Application October 13, 1954, Serial No. 461,976

3 Claims. (Cl. 303—38)

This invention relates to fluid pressure brake apparatus of the graduated release type for use on European railroads, such as is disclosed in the copending United States patent application of Earle S. Cook, Serial No. 390,387, filed November 5, 1953, and assigned to the assignee of the present application, and more particularly, this invention relates to improvements in the brake cylinder inshot and quick service control means comprised in such apparatus.

Such fluid pressure brake apparatus as disclosed in the above-identified patent application is intended for use in Europe on cars of a train which customarily may have various numbers of non-brake-equipped cars interposed between those which are brake-equipped; it being the practice in many of the European countries to limit the maximum speed at which a train may be operated over a given route according to the number of cars in the train which are equipped with brake apparatus and according to the load being hauled by such train, rather than specify the number of cars which must be brake-equipped according to the load and route of the train. This method of train operation necessarily imposes a considerable burden on the quick service brake-pipe-pressure-reducing activity performed by the brake apparatus on a particular car when such car precedes a considerable number of non-brake-equipped cars or cars on which the brake pipe is otherwise piped straight through, and has led to somewhat stringent regulations by European railroads concerning the qualifications which a particular brake apparatus must meet under test.

One regulation of a certain railroad in Europe specifies that the fluid pressure brake apparatus for a single car must be capable of responding to a slight reduction in brake pipe pressure of such as seven-tenths of a pound, for example, to in turn effect a quick service reduction in brake pipe pressure ample to cause attainment of the desirable inshot brake cylinder pressure in the apparatus of such as nine or ten pounds, for example, when the volume of the brake pipe with which said apparatus alone is associated is the equivalent of that of up to fifteen cars.

In actual service on a train, the fluid pressure brake apparatus such as disclosed in the afore-identified patent application functions, when assisted by similar apparatus on other cars of the train, to provide a proper quick service reduction in brake pipe pressure which is adequate for realization of the desired inshot pressure in the brake cylinder devices on such cars. However, in testing performance of a single brake apparatus for only one car without assist from a similar apparatus or similar apparatuses, in behalf of meeting the somewhat arbitrary European railroad requirement, it was found that a single brake apparatus, such as disclosed in the previously-identified Cook application, alone was incapable of effecting the desired quick service reduction in brake pipe pressure adequate for realization of the full degree of inshot pressure in the brake cylinder device in that particular apparatus when the brake pipe volume exceeds that of more than seven or eight cars. Beyond this limit, quick service brake pipe pressure reducing activity of that particular brake apparatus terminated prematurely.

In view of the foregoing remarks, it is a prime object of the present invention to provide an improved fluid pressure brake apparatus for a railway car of the type disclosed in the prevoiusly-identified patent application, which apparatus alone will be capable of effecting a quick service reduction in brake pipe pressure adequate to attain the full degree of brake cylinder inshot pressure when operating in connection with the brake pipe on as many as fifteen or sixteen non-brake-equipped cars.

Additional objects and advantages of my improved fluid pressure brake apparatus will become apparent from the following detailed description thereof taken in connection with the accompanying drawing in which the single figure is a schematic representation, partly in outline and partly in section, of such improved fluid pressure brake apparatus.

Description

In the accompanying drawing the portions of the improved brake apparatus not directly concerned with the improvements therein, such as certain components controlling charging and recharging of the equipment, are shown in outline. Where a detailed explanation of such charging might be necessary for other than an understanding of the improvements of the apparatus, reference may be had to the showing and descriptions set forth in the previously-identified patent application, Serial No. 390,387, of Earle S. Cook.

In addition, attention is called to the fact that the apparatus disclosed in the Cook patent application has somewhat arbitrarily been chosen as a representation of the type of fluid pressure brake apparatus in which the invention and improvements may be incorporated. For this reason, many of the components of the apparatus disclosed in the present application are identical to those shown in the Cook application and bear identical reference numerals, so that reference can be made, if necessary, to the Cook application for numerous structural details of the apparatus not considered to be essential to an understanding of the present invention and which may not be included in this application. In the present application, those components of the improved brake apparatus which differ in form and/or function from the apparatus of the Cook application will bear reference numerals not found in such Cook application, to avoid conflict between the disclosures.

Referring now to the drawing in the present application, the improved fluid pressure brake apparatus comprises a brake controlling valve device 1, adapted to operate in response to a reduction in pressure in a brake pipe 2 to control supply of fluid under pressure from an auxiliary or supply reservoir 3 to a brake cylinder device 4 to apply brakes on a railway car, and adapted to operate in response to charging of said brake pipe wtih fluid under pressure to charge said supply reservoir with fluid under pressure and to release fluid under pressure from said brake cylinder device.

The brake controlling valve device 1 comprises a pipe bracket 5 to which the brake pipe 2, supply reservoir 3, and brake cylinder device 4 are adapted to be connected and on one face of which is mounted a divided casing including a graduating control or service valve device 6, a brake cylinder inshot valve device 7, a quick service valve device 8, a charging valve device 9, a charging cut-out valve device 10, a control reservoir charging check valve device 11, a control reservoir overcharge check valve device 12, an auxiliary reservoir overcharge check valve device 13, and an auxiliary reservoir charging check valve device 14.

Control reservoir 16, disposed externally of the device 1, is also connected to the pipe bracket 5, and cast within a portion of the divided casing is a quick service reservoir volume chamber 15.

The graduating control or service valve device 6 comprises a brake cylinder release valve 16a of the poppet type which is slidably guided at its outer peripheral edge by the walls of a bore 17 and is urged by a light bias spring 18 disposed in said bore, through the medium of a spring follower 19, in the direction of a brake cylinder pressure chamber 20 into which one end of said bore opens. Movement of the valve 16 in the direction of chamber 20 by the bias spring 18 is limited by engagement of the valve 16a at its outer peripheral edge with an annular shoulder 21 formed in the casing at the open end of said bore. A release valve seat element 22 in the form of a cylindrical stem is slidably guided within a bore 23 which opens into the brake cylinder pressure chamber 20 in coaxial alignment with the bore 17. The seat element 22 is provided with a brake cylinder release passage 24 which opens into the brake cylinder chamber 20 and is encircled by an annular release valve seat 25 at its one end. Release passage 24 extends axially inward of said element 22 into open communication with an annular groove 26 formed in the outer periphery of said element. An atmospheric vent passage 27 is provided in the casing which is constantly open to the atmosphere at one end by way of a brake cylinder release control choke 28 and at its opposite end opens into the wall of the bore 23 at such a location relative to the groove 26 in element 22 that such end of passage 27 will be open to said groove when the annular seat 25 of said element 22 is disposed away from the brake cylinder release valve 16a.

The release valve seat element 22 is operably connected to a diaphragm 29 through the medium of a diaphragm follower member 30 formed integrally with said element 22, and the diaphragm follower member 31 clamped to member 30 by a nut 32. The diaphragm 29 is subject opposingly to pressure of fluid in a brake cylinder pressure chamber 33 at one side and to atmospheric pressure in a non-pressure chamber 34 at its opposite side.

The brake cylinder pressure chamber 20 is in constantly open communication with the brake cylinder device 4 by way of a passage 36, a brake cylinder pressure chamber 37 in the brake cylinder inshot valve device 7, a passage 38, a choke 39 in pipe bracket 5, a header chamber 40, a passage 41, and a pipe 42.

The non-pressure chamber 34 at one side of the diaphragm 29 is constantly open to the atmosphere by way of a port and passage 43, while, according to a feature of the invention, the brake cylinder pressure chamber 33 at the opposite side of the diaphragm 29 is in constantly open communication with a passage 94, to be described herein subsequently, by way of a choke 160, also to be desribed herein subsequently, and said chamber 33 is also in constantly open communication with a branch of the passage 36 by way of a choke 201. It will be noted that unrestricted communication of the output end of the choke 160 with the passage 36 as in the Cook application, according to a feature of the invention as disclosed herein, is non-existent.

A light bias spring 44 disposed in the brake cylinder pressure chamber 33 in encirclement of the release valve seat element 22 cooperates with the casing and with the diaphragm follower member 31 to urge the diaphragm assemblage including diaphragm 29 in the direction of the non-pressure chamber 34 toward a reciprocable stem 45, for reasons which hereinafter will become apparent.

The graduating control or service valve device 6 is further provided with a piston type slide valve 46 for controlling admission of fluid under pressure from the auxiliary or supply reservoir 3 to the brake cylinder device 4, and for controlling admission of fluid under pressure from the brake pipe 2 to said auxiliary reservoir 3 and to the control reservoir 16 under certain operating conditions which will now be described herein.

The valve 46 is disposed within a bore 47 in slidably guided and sealed cooperation with the walls thereof. The bore 47 is formed in coaxial alignment with the bores 17 and 23 and the uppermost end of the valve 46 abuts the respective end of the stem 45 engaged by the diaphragm follower member 30, while the opposite end of the valve 46 is operably connected to a resilient diaphragm 48 through the medium of a follower member 49, formed integrally with said valve, and a follower member 50 clamped to said member 49 through the medium of a stud and bolt arrangement 51. The diaphragm 48 is subject opposingly to pressure of fluid in a brake pipe pressure chamber 52 at one side and the pressure of fluid in a control reservoir pressure chamber 53 at its opposite side.

An annular groove 54 is formed in the outer periphery of the valve 46 for connective registry with upper and lower port ends 36b, 36a of a respective branch of the brake cylinder passage 36 and with a port end of an auxiliary reservoir passage 55 for communication of fluid under pressure from the latter passage to the former passage; such port ends of the two passages opening radialwise into the wall of bore 47 in which said valve 46 is slidably disposed.

The auxiliary reservoir passage 55 is constantly open to the auxiliary reservoir 3 by way of branches of said passage 55 and a corresponding pipe 55 connected to said reservoir, while, as previously decribed, the brake cylinder passage 36 is constantly open to the brake cylinder device 4.

One end of the bore 47 is closed by an end wall 56 which separates the interior of such closed end of the bore from the atmospheric non-pressure chamber 34, while the opposite end of said bore 47 opens centrally into the brake pipe pressure chamber 52 at one side of the diaphragm 48. A central passage 57 extends through the valve 46 from the projecting end thereof to a point adjacent to the diaphragm follower member 49; the one end of said passage 57 opening into the interior of the bore 47 adjacent to the wall 56, while the opposite end of said passage 57 is in constantly open communication by way of a radial port 58 with the brake pipe pressure chamber 52. Equalization of pressures at opposite ends of piston valve 46 is thereby established.

A groove 59 is also formed in the piston valve 46 for registry with the port end of a reservoir charging passage 60, via which charging of the auxiliary and control reservoirs 3 and 16 may transpire as set forth in the previously-identified patent application, but such operation is deemed to be of no direct concern to the present invention and will not be described further herein.

A brake pipe pressure chamber charging groove 61 is also provided in the valve 46 in the outer periphery thereof for registry with the port end of the brake pipe passage 62 to communicate fluid under pressure therefrom to the brake pipe pressure chamber 52.

Reciprocable movement of the slide valve 46 under the influence of the diaphragm 48 and/or the diaphragm 29 controls registry of the grooves 54, 59 and 61 with the passages 36, 55, 60 and 62, in manner as will be described in part hereinafter.

In addition, the graduating control or service valve device 6 comprises a retarded recharge control spring 63 operatively connected to the diaphragm 48, through the medium of such elements as 50, 64 and 66, for reasons of no direct concern to the present invention.

The control reservoir pressure chamber 53 in the graduating control or service valve device 6 is constantly open to the control reservoir 16 by way of a passage 67 and a corresponding pipe 67 connected to said control reservoir.

Insofar as is of concern to the present invention, for sake of simplification, the service valve device 6 will hereinafter be referred to as having an application position, a brake cylinder maintaining position, a lap position, and a release position, according to position of seat element 22 relative to the release valve 16a and to position of the groove 54 in slide valve 46 relative to the auxiliary reservoir passage 55.

The release position of the service valve device 6 is hereby defined to be that position of the diaphragm stack including diaphragms 29 and 48 in which the release valve seat 25 of element 22 is disposed away from the release valve 16a, and, in the slide valve 46, the brake cylinder supply groove 54 is out of registry with either of the ports 36a or 36b of the brake cylinder passage 36, while the diaphragm follower member 50 may or may not be in abutment with the movable stop element 64 while same remains in contact with the fixed stop element 66 being held in the position in which it is shown in the drawing by the spring 63.

The application position of the service valve device 6 is hereby defined to be that position of the diaphragm stack in which the release valve seat 25 of element 22 is in seating engagement with the release valve 16a and, in the slide valve 46, the brake cylinder supply groove 54 is in registry with the auxiliary reservoir passage 55 and with both the top and bottom ports 36b and 36a of the brake cylinder passage 36.

The brake cylinder maintaining position of the service valve device 6 is hereby defined to be that position of the diaphragm stack in which the release valve seat 25 of the element 22 is in seating engagement with the release valve 16a, and, in the slide valve 46, the brake cylinder supply groove 54 is in registry with the auxiliary reservoir passage 55 and with the bottom and restricted port 36a of the brake cylinder passage 36.

The lap position of the service valve device 6 is hereby defined to be that position of the diaphragm stack in which the release valve seat 25 is in engagement with the release valve 16a, and, in the slide valve 46, the brake cylinder supply groove 54 is in registry with the reservoir passage 55 but out of registry with either of the brake cylinder passage ports 36a, 36b.

In all of the above-defined positions of the diaphragm stack in the service valve device 6, the brake pipe pressure chamber charging groove 61 remains in registry with the brake pipe passage 62 and remains open to the brake pipe pressure chamber 52.

The brake cylinder inshot valve device 7 comprises brake cylinder inshot control valve means in the form of a poppet type valve 68 which is slidably guided at its outer peripheral edge within the walls of a bore 69 for cooperation with an annular seat 70 to control communication between the brake cylinder pressure chamber 37 and a brake cylinder pressure chamber 71 by way of a central opening 72 extending between said chambers. A bias spring 73 urges the valve 68 in the direction of the seat 70, while a valve actuating stem 74, extending through the chamber 71 and the opening 72 into the chamber 37, is provided for effecting unseating of the valve 68 against opposition of spring 73. The actuating stem 74 extends slidably through a bore 75 in a partition 76 which divides chamber 71 from a chamber 77 and in which latter chamber the respective end of the stem 74 projects. The lowermost end of the stem 74, as viewed in the drawing, is operably connected to a diaphragm 78 through the medium of diaphragm operation modifying valve 79 and a diaphragm follower member 79a associated with said diaphragm 78. Such operable connection of stem 74 with diaphragm 78 is maintained by virtue of a compression spring 80 disposed in chamber 77 and arranged to urge the lowermost end of the stem 74 into abutting engagement with the central portion of the valve 79 through the medium of an annular spring follower element 81 encircling said stem 74 and abutting an annular shoulder formed therein.

The follower member 79a is provided with an annular sleeve portion or sleeve-like element 82 which projects into a chamber 83 in encirclement of an annular seat 84 at an opening of the chamber 77 with said chamber 83. The annular seat 84 accommodates the valve 79 for seating engagement therewith, while the sleeve-like element 82 guides the valve 79 for registry with the seat 84 during self-aligning movement of the valve.

According to a feature of the invention, a spring follower element 203 projects centrally from the diaphragm follower member 79a into the interior of the sleeve-like element 82 for abutting engagement with a central portion of the lower face of the valve 79 against which portion said valve is urged by the springs 73 and 80 through the medium of the actuating stem 74.

The spring follower element 203 is in the form of a hollow cylinder to accommodate a bias spring 204 disposed therein, and is slidably mounted in a central opening 205 formed in the diaphragm follower member 79a.

Spring 204 is interposed between an annular shoulder 206 formed in said follower member 79a and an end wall 207 of the portion of said spring follower element 203 which abuts the central portion of the valve 79. The bias spring 204 functions, through the medium of the spring follower element 203, to urge the valve 79 to move relative to the diaphragm follower member 79a in the direction of the seat 84.

An annular stop element 208 is attached to the projecting end of the sleeve-like element 82 to define the limit of travel or movement of valve 79 away from follower member 79a under the influence of bias spring 204.

An annular radially-extending shoulder 209 is formed in the outer periphery of element 203 adjacent to its end wall 207 for abutment with the upper face of follower member 79a to define a stop position with respect to travel of said element 203 into opening 205.

A port 210 in element 203 adjacent to its end wall 207 constantly connects the interior of element 203 to the chamber 83.

The diaphragm follower member 79a is suitably clamped for movement with the deflection of the diaphragm 78 by cooperation with a corresponding diaphragm follower member 86 held in place by a nut 87 in screw-threaded attachment with a stud portion of said follower member 79a.

One face of the diaphragm 78 is exposed to pressure of fluid in the chamber 83, while the opposite face of said diaphragm is exposed to atmospheric pressure in a non-pressure chamber 88 which is constantly open to the atmosphere by way of a port 89.

A control spring 90 is disposed in the non-pressure chamber 88 and is arranged to urge, through the medium of the diaphragm follower member 86, the assemblage including diaphragm 78 in the direction of the chamber 83 toward the position in which said assemblage is shown in the drawing and in which the valve 79 is closed in seating engagement with the seat 84 and the valve 68 is held away from its seat 70 by virtue of the position of stem 74.

Also operably connected to the diaphragm 78 there is a piston type slide valve 91 which is secured for movement with deflection of diaphragm 78 by integral attachment with a centrally projecting portion of the diaphragm follower member 79a. The slide valve 91 includes a longitudinally-extending passage 92 which is constantly open at its uppermost end, as viewed in the drawing, to the chamber 83 by way of the interior of the spring follower element 203 and a restricted radial port 210. The lowermost end of the passage 92 is provided with a radial port 211 adapted for registry with the port 93 in the casing, which opens into the non-pressure chamber 88, when the diaphragm 78 is in the position in which it is shown in the drawing, and for registry with the port end of the previously mentioned passage 94 when the diaphragm 78 and assemblage are at an opposite position to be described hereinafter.

An annular groove 95 formed in the outer periphery of the slide valve 91 is also provided for establishing communication between the quick service volume chamber 15 by way of a passage 96 and the passage 94 when said slide valve 91 is in the position in which it is shown in the drawing, and to disestablish such registry or communication when said valve is caused to assume an alternate position corresponding to the opposite position of the diaphragm and assemblage referred to in the previous paragraph.

In the brake cylinder inshot valve device 7, the brake cylinder pressure chamber 71 is in constantly open communication with the brake cylinder device 4 through the medium of passage 97, the header chamber 40, passage 41 and pipe 42, while the chamber 77 in said device 7 is also in constantly open communication with said brake cylinder device 4 through the medium of the passage 98, a choke 99, and said header chamber 40.

In operation of brake cylinder inshot valve device 7, when the brake cylinder pressure as experienced in chamber 77 in said device 7 is below such as six pounds, said device will assume the position in which it is shown in the drawing and in which the poppet valve 68 is held off its seat 70 to establish communication between the chambers 37 and 71; the valve 79 will be seated and closing off said chamber 77 from the chamber 83, and the slide valve 91 will be positioned to establish communication between said chamber 83 and the atmosphere by way of restricted port 210 in element 203, the interior of said element 203, the passage 92, port 211, port 93, non-pressure chamber 88, and the port 89, while the groove 95 in valve 91 will be in registry with the passages 94 and 96 to establish communication therebetween for reasons which hereinafter will become apparent.

Conversely, when the brake cylinder pressure as experienced in the chamber 77 increases to and above its full desired inshot value of such as ten pounds, such pressure as exerted on the valve 79 within the confines of the annular seat 84 will be sufficient to overcome the opposition of the control spring 90 and cause rapid movement of the diaphragm assemblage including valve 79 in the direction away from said seat 84, thereby establishing communication between said chamber 77 and the chamber 83 and permitting flow of fluid under pressure from the former into the latter by way of the unseated valve 79.

Upon such flow of fluid under pressure initially into chamber 83, the entire area of the diaphragm assemblage, including the diaphragm 78, becomes exposed to the pressure of such fluid which at this stage is prevented from dissipation via passage 92 and vent port 96 by the restrictive effect of the port 210, and hence the diaphragm assemblage completes the movement in the direction of the chamber 88 at a rapid rate to assume a brake cylinder inshot cut-off and quick service cut-off position defined by engagement of the lowermost end of the slide valve 91 with an annular shoulder 91a formed in the casing, and in which position the poppet valve 68 will be seated by the spring 73 and closing off the chamber 37 from the chamber 71. In such position of the valve 91, the port 211 of the passage 92 will be out of registry with the port 93, so that the chamber 83 will be closed off from the non-pressure chamber 88 by way of passage 92 and the groove 95 will be out of registry with the passage 94 to close off same from passage 96.

According to a feature of the invention, during such movement of the diaphragm assembly in the inshot valve device 7 in response to pressurization of the brake cylinder pressure chamber 77 to the extent of and above ten pounds as described above, the light bias spring 204 associated with diaphragm follower member 79a will cause the valve 79 to move away from said follower member within the sleeve-like element 82 thereof until said valve engages the annular stop element 208. Upon engagement of valve 79 with stop element 208, the port 211 becomes blanked off from the port 93 as the assemblage continues to assume its lowermost limit position previously defined by engagement of the slide valve 91 with the annular shoulder 91a and in which limit position said valve 79 engaging the stop element 208 will be held disposed away from its seat 84, so that said chamber 77 will remain in communication with the chamber 83.

Subsequent reduction in brake cylinder pressure as experienced in chambers 77 and 83 from a value in excess of ten pounds to a value less than six pounds, for example, will permit the diaphragm assemblage including diaphragm 78 to move in the direction of said chamber 83.

Initially, such movement in the direction of chamber 83 will first bring the valve 79 into engagement with its seat 84 to close off communication between chambers 77 and 83 and during which initial movement the latter chamber remains closed to the atmosphere to prevent bleed-off of fluid under pressure from the brake cylinder device 4 by way of said chamber 83 in the event a reapplication of brakes is attempted during the time that the inshot valve device is responding as presently in discussion to a brake release condition.

Continued movement of the diaphragm assemblage in the direction of the chamber 83 immediately subsequent to seating of valve 79 causes the port 211 of passage 92 in slide valve 91 to be brought into registry with the port 93 for venting chamber 83 to the atmosphere, as the sleeve-like element 82 of follower 79a moves relative to the seated valve 79 and the cylindrical spring follower element 203 is caused to recede into the opening 205 in said follower member 79a against opposition of the light bias spring 204.

Registry of the port 211 of passage 92 with the port 93 permits release of fluid under pressure from the chamber 83 by way of the restricted port 210 in the spring follower element 203, the interior of element 203, the passage 92 and port 211 in valve 91, the port 93, the non-pressure chamber 88, and the vent port 89.

Such movement continues until the annular shoulder 209 formed in the outer surface of said cylindrical spring follower element 203 engages the upper face of the follower member 79a in encirclement of the opening 205, to attain the limit position in which the components are shown in the drawing, and in which the groove 95 in the slide valve 91 is again in registry with the passage 94 as well as with the passage 96, for reasons which hereinafter will become apparent.

The quick service valve device 8 comprises a piston-type slide valve 100 which is operably connected to a diaphragm 101 subject opposingly to pressure of fluid in a brake pipe pressure chamber 102 at its one side and to pressure of fluid in an auxiliary reservoir pressure chamber 103 at its opposite side. The slide valve 100 is slidably guided within a counterbore 104 which open into the chamber 102 and an annular quick service supply groove 105 is formed in the outer periphery of the valve 100. A radial port 106 formed in the casing constantly communicates the groove 105 with the brake cylinder pressure chamber 102, and the groove 105 is so proportioned and disposed relative to a quick service volume supply passage 107 as to be in registry therewith when the valve 100 is caused to assume a quick service position defined by engagement of the end of said valve with the end wall of the counterbore 104. The valve 100 may be formed integrally with a diaphragm follower member 108 which is suitably clamped to the diaphragm 101 by cooperation with a corresponding diaphragm follower member 109 secured in place through the medium of a stud and bolt arrangement 110. A light bias spring 111 is disposed in the brake pipe pressure chamber 102 and arranged in cooperation with the diaphragm follower member 108 to urge movement of the diaphragm assemblage in the direction of the auxiliary reservoir pressure chamber 103 to a quick service cut-off position in which the assemblage, including the valve 100, is shown in the drawing and which position is defined by engagement of the follower member 109 with an annular stop shoulder 112 formed in the casing.

In the quick service valve device 8, the auxiliary reservoir pressure chamber 103 is in constantly open communication with the auxiliary reservoir 3 by way of a respective branch of the auxiliary reservoir passage 55 and pipe 55, and the brake pipe pressure chamber 102 is in constantly open communication with the brake pipe 2 by way of the respective branches of the brake pipe passage 62.

In operation of the quick service valve device 8, when the brake pipe pressure as experienced in the brake pipe pressure chamber 102 is in excess of or substantially equal to the auxiliary reservoir pressure as experienced in chamber 103, the quick service valve device will assume the quick service cut-off position in which it is shown in the drawing and in which position the slide valve 100 will be so disposed that the groove 105 will be out of registry with the quick service volume supply passage 107 so that same will be cut off from the brake pipe pressure chamber 102. When the brake pipe pressure as experienced in chamber 102 reduces to the extent of being at least slightly below that of the auxiliary reservoir pressure existent in chamber 103, such as a fraction of a pound, for example, as during initiation of a brake application, the resultant preponderance in pressure of fluid in the chamber 103 acting on the diaphragm 101 will cause deflection of said diaphragm in the direction of chamber 102, with consequent movement of the valve 100 to its quick service position in which the groove 105 is brought into registry with the quick service volume supply passage 107, thereby establishing communication between said passage and brake pipe pressure chamber 102, for reasons which hereinafter will become apparent.

It will be apparent also, if while the quick service valve device 8 is in its quick service position the auxiliary reservoir pressure existent in the chamber 103 reduces to a value substantially equal to or less than the brake pipe pressure in chamber 102, the spring 111 in said device 8 will effect return of the quick service valve device 8 to its quick service cut-off position in which it is shown in the drawing. At the same time, while the quick service valve device 8 is in its cut-off position opposite to that in which it is shown in the drawing, substantial equalization of pressures across the diaphragm 101 may occur by virtue of an increase in brake pipe pressure in chamber 102 relative to auxiliary reservoir pressure in chamber 103 which will permit the spring 111 to effect return of the diaphragm assemblage including valve 100 to their respective positions in which they are shown in the drawing.

*Operation*

Assume initially that the service valve device 6 is in its release position in which it is shown in the drawing; that the brake cylinder inshot valve device 7 is in its brake cylinder inshot position in which it is shown in the drawing; that the quick service valve device 8 is in its quick service cut-off position in which it is shown in the drawing; that the pressure of fluid in the brake pipe 2, the auxiliary reservoir 3, and the control reservoir 16, is at a full normal charge value of such as seventy-one pounds, for example, and that the brake cylinder device 4 is devoid of fluid under pressure.

Assume now that pressure of fluid in the brake pipe 2 on a particular car of the train is reduced to call for an application of the brakes. When the brake pipe pressure as experienced in the brake apparatus on that particular car reduces to the extent of such as seven-tenths of a pound, for example, such reduction will be experienced in the brake pipe pressure chamber 102 in the quick service valve device 8, while the auxiliary reservoir pressure in its chamber 103 remains at its full charge value of seventy-one pounds, for example, and will cause diaphragm 101 to deflect in the direction of said chamber 102 in opposition of the spring 111 and move the slide valve 100 to its quick service position. Thereupon, the brake pipe pressure chamber 102 becomes open to the quick service volume chamber 15 by way of the port 106 and groove 105 in the valve 100, and the passage 107.

Upon the quick service valve device 8 thus assuming its quick service position opposite to that in which it is shown in the drawing, fluid under pressure from the brake pipe 2 on that particular car will flow by way of the passage 62, the chamber 102 in said valve device 8, the port 106, the groove 105 in slide valve 100 of said device 8, and the passage 107 to the quick service volume chamber 15.

If, at the time the fluid under pressure from the brake pipe 2 goes into the quick service volume chamber 15 on the particular car in discussion, the volume of the brake pipe 2 is that of only the single car through which it extends and there are no other subsequent sections of brake pipe connected to that, then by flow of fluid under pressure from the brake pipe by way of the quick service valve device 8 on that particular car into the respective quick service volume chamber 15 the pressure of fluid in brake pipe 2 may be reduced rapidly to the extent of four pounds, for example, below its normal full charge value of seventy-one pounds.

During the time that the rapid reduction in brake pipe pressure to the extent of four pounds is occurring by way of the quick service valve device 8 into the quick service volume chamber 15, the service valve device 6 will have responded to such reduction in brake pipe pressure as realized in chamber 52 to the extent of one and one-half or two pounds by assuming its application position under influence of the preponderant control reservoir pressure existent in its chamber 53, with consequent closure of the release valve 16a and supply of fluid under pressure from the auxiliary reservoir 3 to the brake cylinder device 4 by way of the pipe and passage 55, the groove 54 in slide valve 46 of service valve device 6, ports 36a and 36b, the passage 36, chambers 37 and 71 in the brake cylinder inshot valve device 7, passages 38 and 97, the choke 39, the header chamber 40, the passage 41, and the pipe 42. In response to the rapid build-up in brake cylinder pressure by way of both chambers 37 and 71 in the brake cylinder inshot valve device 7, attainment of the brake cylinder pressure of ten pounds, for example, will occur rapidly and the service valve device 6 will respond to such pressure as realized in its chamber 33, via the choke 201 and passage 36, to overcome opposition of the control reservoir pressure in chamber 53 acting on diaphragm 48 and move the slide valve 46 to its lap position for bottling up the brake cylinder fluid at the ten pound pressure value, corresponding to the reduction in brake pipe pressure in its chamber 52 to four pounds below control reservoir pressure in chamber 53 and corresponding to a diaphragm ratio of two and one-half to one, that is, for every single pound of reduction in brake pipe pressure in chamber 52 below control reservoir pressure in chamber 53 two and one-half pounds of brake cylinder pressure is required to be built up in the chamber 33 in order to cause the slide valve 46 to assume its lap position.

Substantially at the same time, upon attainment of ten pounds of brake cylinder pressure as realized in the chamber 77 in the brake cylinder inshot valve device 7, same will be caused to assume its brake cylinder inshot cut-off position opposite to that in which it is shown in the drawing as previously described herein in which the slide valve 91 is positioned to cut off communication between the passage 96 and the passage 94, hence between the quick service volume chamber 15 and the chamber 33 in the service valve device 6 by way of the choke 160 and passage 200 and hence between said chamber 15 and the brake cylinder device 4 by way of said choke 160, passage 200, the choke 201, passage 36, etc. as previously traced.

Thus it will be seen that a reduction in brake pipe pressure adequate for realization of the full desired brake cylinder inshot pressure of such as ten pounds, for example, will be realized by connection of brake pipe to the quick service volume chamber via the quick service valve device 8 without resort or reliance upon continued quick service activity, or upon pressurization of the chamber 33 in the service valve device 6 by flow of fluid under pressure from the quick service volume chamber 15 thereto by way of passage 96, the groove 95 and the valve 91 of the inshot valve device 7, the passage 94, the choke 160 and the passage 200. The total time required subsequent to movement of the quick service valve device to its quick service position until closure of the inshot valve device 7 is approximately one second, and during that short interval of time the choke 160 discourages flow of fluid under pressure from the quick service volume chamber 15 to the chamber 33 in the service valve device via the groove 95 in the valve 91 of the inshot valve device 7 while the pressure of fluid as experienced in said chamber 33 is substantially the same as that realized in brake cylinder device 4 by virtue of the size of the choke 201 in communication with the passage 36 from the service valve device through which fluid under pressure is being supplied to the brake cylinder device.

Assume now that at the time that the particular quick service valve device 8 in discussion assumes its quick service position as previously described the brake pipe 2 on the particular car to which the subject brake apparatus is connected is in turn connected to continuously interconnected sections of brake pipe on such as fifteen non-brake-equipped cars, and also assume that it is desired, by virtue of an initial reduction in brake pipe pressure on such car sufficient only to cause the quick service valve device 8 to assume its quick service position, to cause in turn the realization of the desired brake cylinder inshot pressure of such as the ten pounds chosen for example. Under such circumstances, fluid under pressure from the brake pipe will flow by way of the passage 62, and in quick service valve device 8, the chamber 102, the port 106, the groove 105 in valve 100, and the passage 107 to the quick service volume chamber 15. Under the condition of the excessive brake pipe volume, such flow of fluid under pressure from the brake pipe 2 on that particular car in discussion to the quick service volume chamber 15 will not cause a reduction in pressure in the brake pipe on that car sufficient to attain the desired brake cylinder inshot pressure of ten pounds, but such reduction in brake pipe pressure as caused by flow of fluid under pressure therefrom to the quick service volume chamber 15 may be ample to cause the service valve device 6 to assume either its application position or its brake cylinder maintaining position in response to the quick service volume reduction in brake pipe pressure as experienced in its chamber 52, to permit flow of fluid under pressure from the auxiliary reservoir 3 by way of the passage 55, the groove 54 in slide valve 46 of said service valve device, and both the upper and lower ports 36b and 36a or the lower port 36a according to whichever position the service valve device 6 assumes, the passage 36, etc., to said brake cylinder device.

According to a feature of the invention, after the quick service volume chamber 15 has been filled with fluid under pressure from the brake pipe by way of the quick service valve device 8, fluid under pressure from the brake pipe will continue to flow by way of the quick service valve device 8 and said chamber 15, the passage 96, the groove 95 in the slide valve 91 of the brake cylinder inshot valve device 7, the passage 94, the choke 160, and the passage 200 to chamber 33 in service valve device 6 and, via choke 201, to the brake cylinder device 4 by way of the passage 36, etc., as previously traced. Such flow of fluid under pressure from the brake pipe to the brake cylinder device on that particular car continues the reduction in brake pipe pressure at somewhat reduced rate due to the restriction imposed on such flow by the chokes 160 and 201, while the flow of brake pipe fluid into the chamber 33 in the service valve device 6 by way of the choke 160 and the passage 200 at one side of the choke 201 tends to create a false brake cylinder pressure in such chamber in slight excess of actual brake cylinder pressure existent in passage 36 at the opposite side of said choke 201. This false brake cylinder pressure in chamber 33 causes the rate of pressure increase therein to anticipate the rate of decrease in the brake pipe pressure in chamber 52. Under such circumstances, the diaphragm stack in the service valve device 6, being subjected to the influence of the increasing pressure in its chamber 33 in opposition to the decreasing brake pipe pressure in its chamber 52 will automatically regulate supply of fluid under pressure from the auxiliary reservoir 3 to the brake cylinder passage 36 by adjusting position of its slide valve 46 to control the degree of opening of the brake cylinder supply ports 36a and 36b accordingly.

Such false pressurization of the brake cylinder pressure chamber 33 in the service valve device 6 so controls utilization of auxiliary reservoir fluid in supply to the brake cylinder device 4 that auxiliary reservoir pressure remains sufficiently greater than the brake pipe pressure that the quick service valve device 8 will remain in its quick service position until the brake cylinder pressure is built up to its maximum inshot value and the inshot valve device 7 responds to assume its inshot cut-off position opposite to that in which it is shown in the drawing and as previously described in detail hereinbefore.

At the time that the brake cylinder inshot valve device 7 assumes its closed position opposite to that in which it is shown in the drawing, further flow of fluid under pressure from the brake pipe to the brake cylinder pressure chamber 33 in the service valve device 6 and to the brake cylinder device 4 by way of the quick service valve device 8 terminates. At that time, pressure of fluid in the brake cylinder pressure chamber 33 in service valve device 6 will substantially equalize with that pressure existent in the brake cylinder supply and release passage 36 at the opposite side of the choke 201 and will cause the service valve device 6 to assume its lap position to bottle up fluid under pressure in the brake cylinder device 4 at its inshot value of such as ten pounds, chosen for example, commensurate with the degree of brake pipe reduction in the chamber 52 of such as four pounds as realized by virtue of the continuation of quick-service reduction in brake pipe pressure.

During subsequent increases in degree of brake application as effected by the service valve device 6 in response to further reduction in brake pipe pressure as realized in its chamber 52, the pressure of fluid in the brake cylinder pressure chamber 33 will be substantially the same as that in the brake cylinder device 4, the choke 201 merely acting as a stabilizing choke between passage 36 and said chamber 33 to compensate for the differential in pressures between said passage 36 and the brake cylinder device created as a result of exclusive brake cylinder supply via choke 39 when brake cylinder inshot valve device 7 is in its brake cylinder inshot cut-off position.

Subsequently, quick service valve device 8 may return to its quick service cut-off position in which it is shown in the drawing either in response to a reduction in auxiliary reservoir pressure as realized in chamber 103 during utilization of fluid under pressure from the auxiliary reservoir 3 to effect an increase in brake cylinder pressure, or upon substantial equalization of the brake pipe pressure as experienced in the chamber 102 in the quick service valve device 8 with the auxiliary reservoir pressure in chamber 103 such as during release of the brakes.

In effecting the release of the brakes, in the usual manner, pressure of fluid in the brake pipe 2 is increased proportionately to the desired degree of decrease desired in pressure of fluid in the brake cylinder device, and the service valve device 6 will respond in the usual manner to cause the diaphragm stack including the slide valve 46 to assume its release position, previously defined, in which the stem 22 is disposed away from the release valve 16a to permit fluid under pressure from the brake cylinder device 4 to release to the atmosphere by way of the pipe 42, passage 41, chamber 40, choke 39, passage 38, chamber 37 in the brake cylinder inshot valve device 7, the passage 36, chamber 20, passage 24 and groove 26 in stem 22 of service valve device 6, the passage 27, and the choke 28. Such release of fluid under pressure from the brake cylinder device 4, in the well-known manner, will continue until equilibrium is established between the pressure of fluid in the brake cylinder pressure chamber 33 in the service valve device 6 and the brake pipe pressure existent in its brake pipe pressure chamber 52, whereupon, the diaphragm stack in the service valve device 6 will be caused to assume its lap position, or, if the brake pipe pressure has been increased to its full normal charge value of such as seventy-one pounds, for example, the service valve device 6 will remain in its brake release position while pressure of fluid in the brake cylinder device 4 is reduced to atmosphere by way of the path traced above.

Also, in the well-known manner, upon reduction in brake cylinder pressure to some value such as five or six pounds, for example, the brake cylinder inshot valve device 7 will reassume its brake cylinder inshot position in which it is shown in the drawing and as described herein previously.

Having now described the invention, what we claim as new and desire to secure by Letters Patent, is:

1. In a fluid pressure brake apparatus, in combination, a brake pipe, a brake cylinder, an auxiliary reservoir, a brake cylinder communication connected to said brake cylinder for conveying fluid under pressure thereto and therefrom, service valve means having a brake cylinder pressure chamber and normally connecting said brake cylinder communication to the atmosphere while pressure of fluid in the brake pipe is at a normal charge value and said brake cylinder pressure chamber is devoid of fluid above atmospheric pressure, said service valve means being operative responsively to the preponderant effect of a reduction in brake pipe pressure below its normal full charge value over an increase in pressure of fluid in said brake cylinder pressure chamber to disconnect said brake cylinder communication from the atmosphere and effect supply of fluid under pressure from said auxiliary reservoir to said brake cylinder communication at a rate proportional to the degree of said preponderant effect; choke means connecting said brake cylinder pressure chamber with said brake cylinder communication, and quick service valve means subject opposingly to pressure of fluid in said brake pipe and auxiliary reservoir and responsive to an initial reduction in brake pipe pressure below its normal full charge value while said auxiliary reservoir is fully charged to establish connection between said brake pipe and said brake cylinder pressure chamber to effect a quick service withdrawal of fluid under pressure from said brake pipe via said choke means and said brake cylinder communication and to effect admission of fluid under pressure to said brake cylinder pressure chamber for increasing pressure of fluid therein above that in said brake cylinder communication to either cause delay of supply of auxiliary reservoir fluid thereto via said service valve means and/or to cause the rate of such supply to be reduced to less than the rate which otherwise would prevail if pressure of fluid in said brake cylinder pressure chamber were the same as that in said brake cylinder communication.

2. The combination as set forth in claim 1, further including means responsive to a certain degree of pressure of fluid in said brake cylinder device to close said brake pipe to said brake cylinder pressure chamber.

3. In a brake apparatus including a fluid pressure operated brake cylinder device, the mechanism for closing a normally open brake cylinder inshot control valve upon build-up in brake cylinder pressure to a certain one value and for reopening said brake cylinder inshot control valve upon subsequent reduction in brake cylinder pressure below a certain other value which is less than said certain one value, said mechanism comprising a control communication for constant connection with such a brake cylinder device; a valve seat encircling a control opening to said control communication; a control chamber; a poppet valve guided for movement into and out of engagement with said valve seat to close and open, respectively, said control chamber to said control opening; bias means urging said poppet valve toward a normally closed position in contact with said seat; a breather control valve normally establishing a restricted vent communication between said control chamber and the atmosphere and operable to a closed position to disestablish such restricted vent communication; a control spring; and a movable abutment urged by said control spring toward a normal position in contact with said poppet valve and exposed to said control chamber for subjection to pressure of fluid therein acting in opposition to said control spring, said movable abutment being positively connected to said breather control valve and having a lost-motion connection with said poppet valve whereby upon attainment of a brake cylinder pressure of the aforesaid certain one value in said control opening said poppet valve will be unseated against opposition of said control spring to admit fluid under pressure into said control chamber for rapid actuation of said movable abutment away from said valve seat to move said breather valve to its closed position and engage said poppet valve for holding same unseated, and whereby, upon subsequent reduction of brake pipe pressure in said control chamber to less than the aforesaid certain other value, said control spring will actuate said movable abutment in the direction of said valve seat to first cause said poppet valve to reseat and immediately thereafter to reopen said breather valve and move into engagement with said poppet valve for transmission of control spring force thereto tending to hold same seated.

References Cited in the file of this patent

UNITED STATES PATENTS

| | | |
|---|---|---|
| 1,693,943 | Thomas | Dec. 4, 1928 |
| 2,034,307 | McClure | Mar. 17, 1936 |
| 2,707,134 | Cook | Apr. 26, 1955 |

FOREIGN PATENTS

| | | |
|---|---|---|
| 673,042 | Great Britain | May 28, 1952 |